US009574609B2

(12) United States Patent
Utada et al.

(10) Patent No.: US 9,574,609 B2
(45) Date of Patent: Feb. 21, 2017

(54) SUPERFINISHING MACHINE, SUPERFINISHING METHOD AND OUTER RING OF BEARING HAVING SUPERFINISHED RACEWAY SURFACE

(75) Inventors: Eiji Utada, Fujisawa (JP); Natsuki Sensui, Fujisawa (JP); Takayuki Watanabe, Fujisawa (JP)

(73) Assignee: NSK LTD., Tokyo (JP)

( * ) Notice: Subject to any disclaimer, the term of this patent is extended or adjusted under 35 U.S.C. 154(b) by 353 days.

(21) Appl. No.: 14/356,690

(22) PCT Filed: Jun. 22, 2012

(86) PCT No.: PCT/JP2012/066080
§ 371 (c)(1),
(2), (4) Date: May 7, 2014

(87) PCT Pub. No.: WO2013/069331
PCT Pub. Date: May 16, 2013

(65) Prior Publication Data
US 2014/0301687 A1 Oct. 9, 2014

(30) Foreign Application Priority Data
Nov. 8, 2011 (JP) ................................. 2011-244683

(51) Int. Cl.
*B24B 35/00* (2006.01)
*B24B 19/06* (2006.01)
(Continued)

(52) U.S. Cl.
CPC ............... *F16C 33/58* (2013.01); *B24B 19/06* (2013.01); *B24B 35/00* (2013.01); *F16C 33/64* (2013.01); *F16C 19/364* (2013.01)

(58) Field of Classification Search
CPC ............ B24B 35/00; F16C 33/64; F16C 33/58
(Continued)

(56) References Cited

U.S. PATENT DOCUMENTS

| 2,244,806 A * | 6/1941 | Schmidt | B24B 19/06 |
| | | | 125/11.15 |
| 2,595,121 A | 4/1952 | Bonte | |
| 3,964,211 A * | 6/1976 | Engle | B24B 49/183 |
| | | | 451/21 |

FOREIGN PATENT DOCUMENTS

| CN | 1371782 A | 10/2002 |
| CN | 1500027 A | 5/2004 |

(Continued)

OTHER PUBLICATIONS

International Search Report for PCT/JP2012/066080 dated Sep. 25, 2012 [PCT/ISA/210].
(Continued)

*Primary Examiner* — Robert Rose
(74) *Attorney, Agent, or Firm* — Sughrue Mion, PLLC

(57) ABSTRACT

A superfinishing machine and a superfinishing method which can perform axially uniform finishing on a logarithmically crowned surface formed on an inner peripheral surface of an annular member in a short time, and an outer ring of a bearing having a raceway surface superfinished by the superfinishing method, are provided. A superfinishing machine 1 includes a linearly reciprocating mechanism 40 configured to linearly reciprocate a grinding stone 3 held by a pressing section 30, along a plane B touching a generatrix of the logarithmically crowned surface, and in a direction C inclined by a given angle φ with respect to a center axis O of an outer ring 10.

6 Claims, 8 Drawing Sheets

(51) Int. Cl.
*F16C 33/58* (2006.01)
*F16C 33/64* (2006.01)
*F16C 19/36* (2006.01)

(58) Field of Classification Search
USPC .............................. 451/52, 51, 173; 384/569
See application file for complete search history.

(56) References Cited

FOREIGN PATENT DOCUMENTS

| | | |
|---|---|---|
| CN | 201006587 Y | 1/2008 |
| JP | 51-12157 B1 | 4/1976 |
| JP | S5380896 U | 7/1978 |
| JP | 55-46824 B2 | 11/1980 |
| JP | 9-76151 A | 3/1997 |
| JP | 2002-326153 A | 11/2002 |
| JP | 2007-260829 A | 10/2007 |

OTHER PUBLICATIONS

Office Action dated Dec. 2, 2014 issued by the State Intellectual Property Office of the People's Republic of China in counterpart Chinese Patent Application No. 201280000586.0.

\* cited by examiner

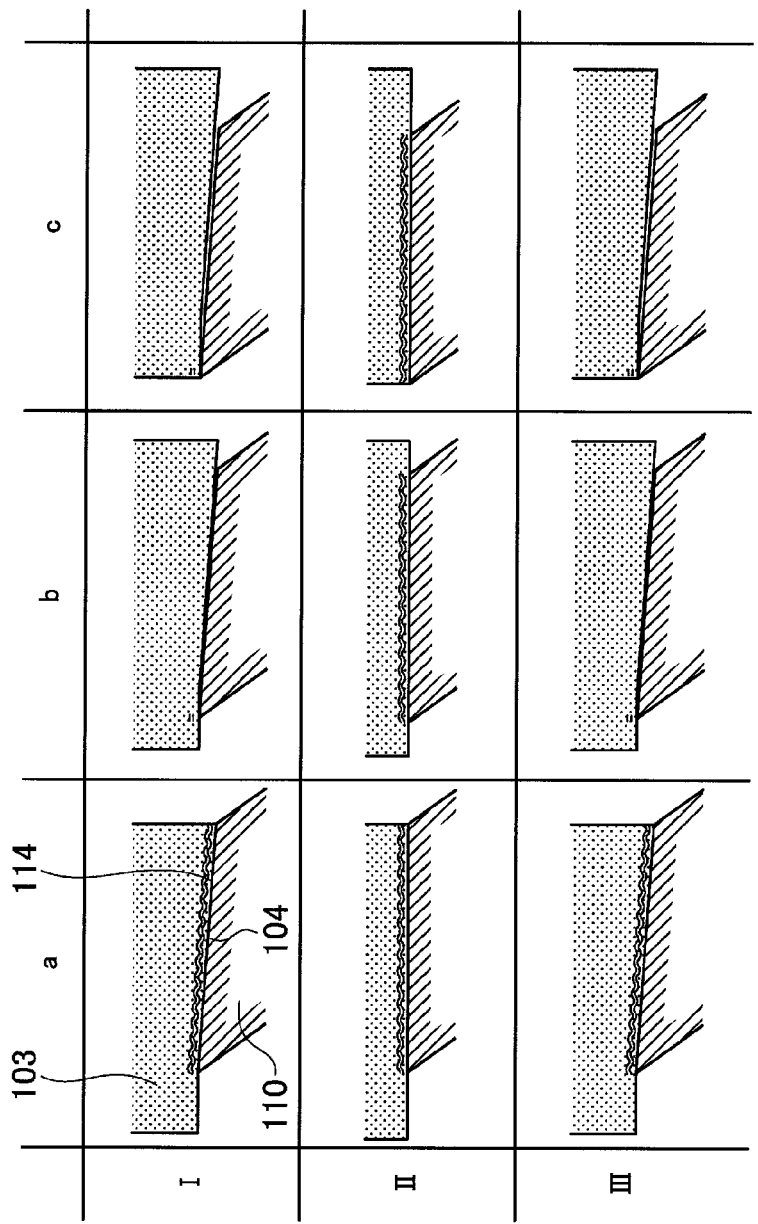

ND RING OF BEARING HAVING
SUPERFINISHING MACHINE, SUPERFINISHING METHOD AND OUTER RING OF BEARING HAVING SUPERFINISHED RACEWAY SURFACE

TECHNICAL FIELD

The present invention relates to a superfinishing machine, a superfinishing method, and an outer ring of a bearing having a superfinished raceway surface.

BACKGROUND ART

Conventionally, as disclosed in Patent Document 1, as a superfinishing method, there is known a method of superfinishing an outer peripheral surface of an annular member, which is an object to be machined, by rotating the annular member around its center axis, in a state in which a grinding stone is brought into pressure contact with the outer peripheral surface of the annular member, and simultaneously oscillating the grinding stone in a direction parallel with the center axis of the annular member along a plane touching a generatrix of the outer peripheral surface of the annular member.

Such a superfinishing method is often used for superfinishing an element of a roller bearing, including rollers or a raceway surface of an inner ring or an outer ring. For example, in Patent Document 2, the superfinishing is performed on the raceway surface of the outer ring of a tapered roller bearing by the same method as the above-described method. More specifically, as illustrated in FIG. 6A, the superfinishing is performed by rotating an outer ring 110 of the tapered roller bearing around a center axis O', and simultaneously, vertically pressing a distal end surface of the grinding stone 103 against a tapered raceway surface 114 formed on an outer peripheral surface of the outer ring 110 and linearly reciprocating the grinding stone in a direction of the center axis O'.

Conditions in which the distal end surface 104 of the grinding stone 103 and a logarithmically crowned surface of the raceway surface 114 of the outer ring 110 contact each other in machining according to the conventional superfinishing method are illustrated in FIG. 6. In FIG. 6A, reference signs a, b, c indicate one end, an intermediate portion, and the other end in the linearly reciprocating movement of the grinding stone 103, respectively. Reference signs I, II, III indicate imaginary planes passing through one side portion, an intermediate portion and the other side portion of the grinding stone 103 in a circumferential direction, respectively. Further, in FIG. 6B, the portion, indicated by a double wavy line, on the distal end surface 104 of the grinding stone 103 represents a portion brought into contact with the raceway surface 114 of the outer ring 110. In the intermediate portion II of the grinding stone 103 in the circumferential direction, the entire surface of the raceway surface 114 of the outer ring 110 always abuts against the distal end surface 104 of the grinding stone 103 at all positions a, b, c when the grinding stone 103 reciprocates linearly. Accordingly, the raceway surface 114 of the outer ring 110 can be superfinished uniformly in an axial direction.

When the roller comes into contact with the raceway surface in the roller bearing, an excessive pressure (so-called edge load) is generally generated at the edge portion of a contact region. To avoid the edge load, the roller or the raceway surface of the inner ring or the outer ring is formed with a slight bulge referred to as a crowning represented by a logarithmic function (hereinafter, the surface provided with the crowning is referred to as a logarithmically crowned surface).

When the raceway surface made of the logarithmically crowned surface is subjected to the superfinishing, the superfinishing method disclosed in Patent Document 1 or 2 is employed, a grinding amount of the logarithmically crowned surface is not uniform in the axial direction of a rolling contact surface, so that a finished surface having the uniform surface roughness may not be obtained. More specifically, as illustrated in FIG. 7, if the raceway surface 114 of the outer ring 110 is made of the logarithmically crowned surface, when the grinding stone 103 is first displaced at the position a, a first crowning drop portion 116 at one side in the axial direction does not abut against the distal end surface 104 of the grinding stone 103. Further, when the grinding stone 103 is displaced at the position b, the first and second crowning drop portions 116, 117 at both sides in the axial direction do not abut against the distal end surface 104 of the grinding stone 103. In addition, when the grinding stone 103 is displaced at the position c, the distal end surface does not abut against the second crowning drop portion 117. That is, when the grinding stone reciprocates linearly, the distal end surface 104 of the grinding stone 103 does not abut against all the crowning center portion 115, the first crowning drop portion 116 and the second crowning drop portion 117 of the raceway surface 114 at any of the positions a, b, c. Therefore, as illustrated in FIG. 8, since the surface roughness of the crowning center portion 115 and the first and second crowning drop portions 116, 117 is varied, the surface roughness of the raceway surface 114 may not be uniform.

Accordingly, according to the superfinishing method disclosed in Patent Document 3, the finishing is performed by traversing the grinding stone in parallel with the crowned surface so that a swing center axis is always maintained in a normal direction of the crowned surface formed on an oscillation surface, thereby preventing a collapse of its shape.

PRIOR ART DOCUMENT

Patent Document

Patent Document 1: JP 51-012157 B1
Patent Document 2: JP 2002-326153 A
Patent Document 3: JP 2007-260829 A

SUMMARY OF INVENTION

Problem to be Solved by Invention

However, according to the superfinishing method disclosed in Patent Document 3, since a grinding stone having a small acting area should be used, the machining efficiency thereof is low, and the superfinishing cannot be performed in a short time. In addition, the grinding stone needs be controlled to be always in parallel with the crowned surface, so that the configuration of the machining device may be complicated.

The present invention has been made in view of the above-described problem, and an object of the present invention is to provide a superfinishing machine and a superfinishing method which can perform axially uniform finishing on a logarithmically crowned surface formed on an inner peripheral surface of an annular member in a short time, and an outer ring of a bearing having a raceway surface superfinished by the superfinishing method.

Means for Solving the Problem

The above object of the present invention is achieved by the following configurations.

(1) A superfinishing machine including:
a rotation jig configured to hold an annular member such that the annular member is rotatable around a center axis of the annular member, the annular member having a logarithmically crowned surface formed on an inner peripheral surface thereof;
a pressing section configured to hold a grinding stone and to bring a distal end surface of the grinding stone into pressure contact with the logarithmically crowned surface of the annular member rotating around the center axis; and
a linearly reciprocating mechanism configured to linearly reciprocate the grinding stone held by the pressing section, along a plane touching a generatrix of the logarithmically crowned surface, and in a direction inclined by a given angle with respect to the center axis of the annular member, thereby superfinishing the logarithmically crowned surface.

(2) The superfinishing machine according to (1), wherein the distal end surface of the grinding stone has a quadrangular shape in a cross section when seen from a radial direction and is formed such that a set of opposite sides is parallel to the inclined direction, and
each side portion of the distal end surface in a circumferential direction is formed with a portion configured to abut against all locations on the logarithmically crowned surface along the inclined direction.

(3) The superfinishing machine according to (1) or (2), wherein the annular member is an outer ring of a tapered roller bearing, and
the outer ring is rotated around the center axis, and the distal end surface of the grinding stone is brought into pressure contact with a raceway surface, being the logarithmically crowned surface, formed on an inner peripheral surface of the outer ring, thereby superfinishing the raceway surface.

(4) The superfinishing machine according to (1) or (2), wherein the annular member is an outer ring of a cylindrical roller bearing, and
the outer ring is rotated around the center axis, and the distal end surface of the grinding stone is brought into pressure contact with a raceway surface, being the logarithmically crowned surface, formed on an inner peripheral surface of the outer ring, thereby superfinishing the raceway surface.

(5) A superfinishing method including:
bringing a distal end surface of a grinding stone into pressure contact with a logarithmically crowned surface formed on an inner peripheral surface of an annular member rotating around a center axis thereof to superfinish the logarithmically crowned surface; and
linearly reciprocating the grinding stone in a direction inclined by a given angle with respect to the center axis of the annular member along a plane touching a generatrix of the logarithmically crowned surface.

(6) An outer ring of a tapered roller bearing, the outer ring including a raceway surface superfinished by the superfinishing method set forth in (5).

(7) An outer ring of a cylindrical roller bearing, the outer ring including a raceway surface superfinished by the superfinishing method set forth in (5).

Advantages of Invention

According to the superfinishing machine of the present invention, the superfinishing machine includes the linearly reciprocating mechanism linearly reciprocating the grinding stone held by the pressing section, along a plane touching a generatrix of the logarithmically crowned surface, and in a direction inclined by a given angle with respect to the center axis of the annular member. Therefore, the grinding stone can be brought into contact with the logarithmically crowned surface at all locations along the axial direction thereof at any position in the linearly reciprocating movement, whereby the axially uniform finishing can be performed in a short time.

BRIEF DESCRIPTION OF DRAWINGS

FIG. 6 is a diagram illustrating a conventional superfinishing method, in which FIG. 6A is a diagram illustrating a manner in which a grinding stone linearly reciprocates on a raceway surface of an outer ring, and FIG. 6B is a diagram illustrating conditions in which a distal end surface of the grinding stone and a raceway surface of an outer ring contact each other;

FIG. 7 is a diagram illustrating another conventional superfinishing method, in which

EMBODIMENTS OF INVENTION

Hereinafter, an embodiment of a superfinishing machine, a superfinishing method, and an outer ring of a bearing having a superfinished raceway surface, according to the present invention will be described in detail with reference to the drawings.

Embodiment 1

Figure 1:
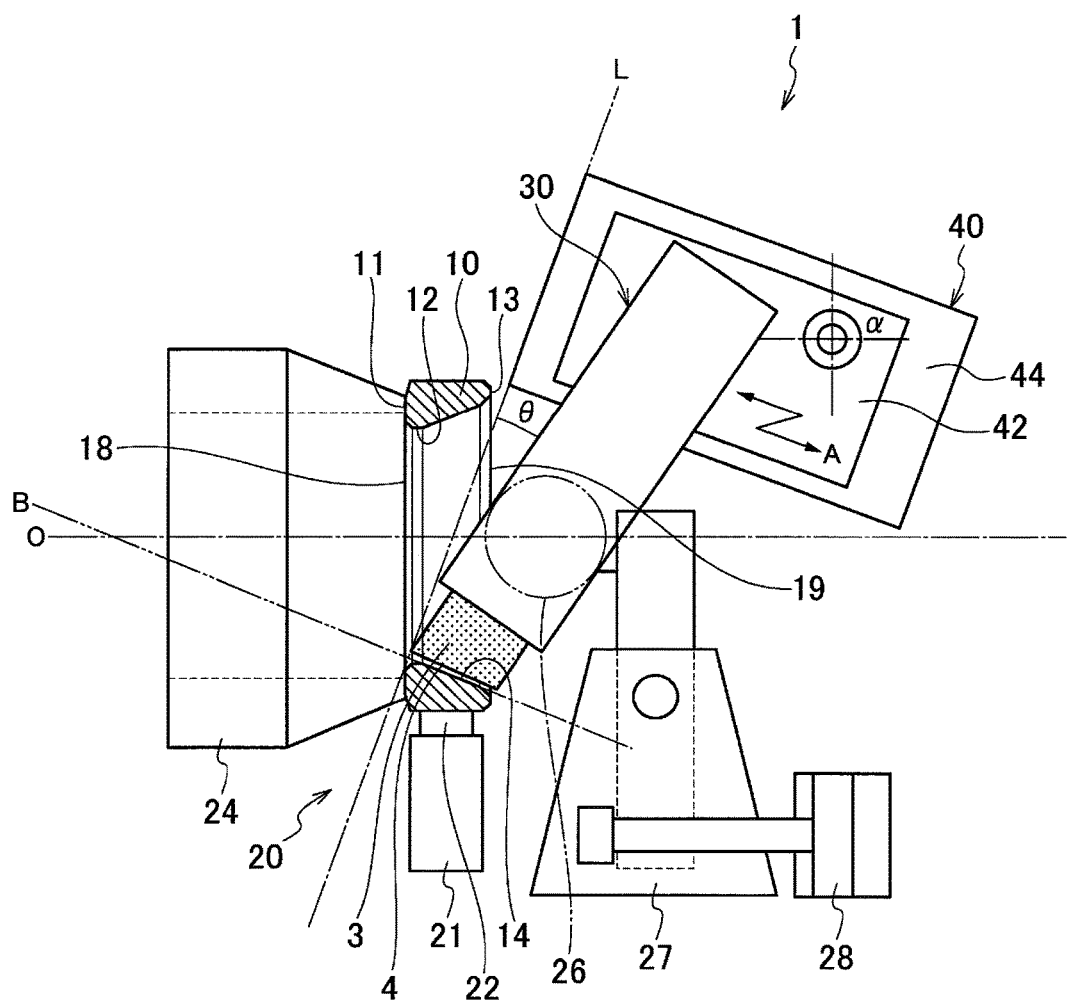
FIG. 1 is a schematic side view of a superfinishing machine according to an embodiment of the present invention.
Figure 2:
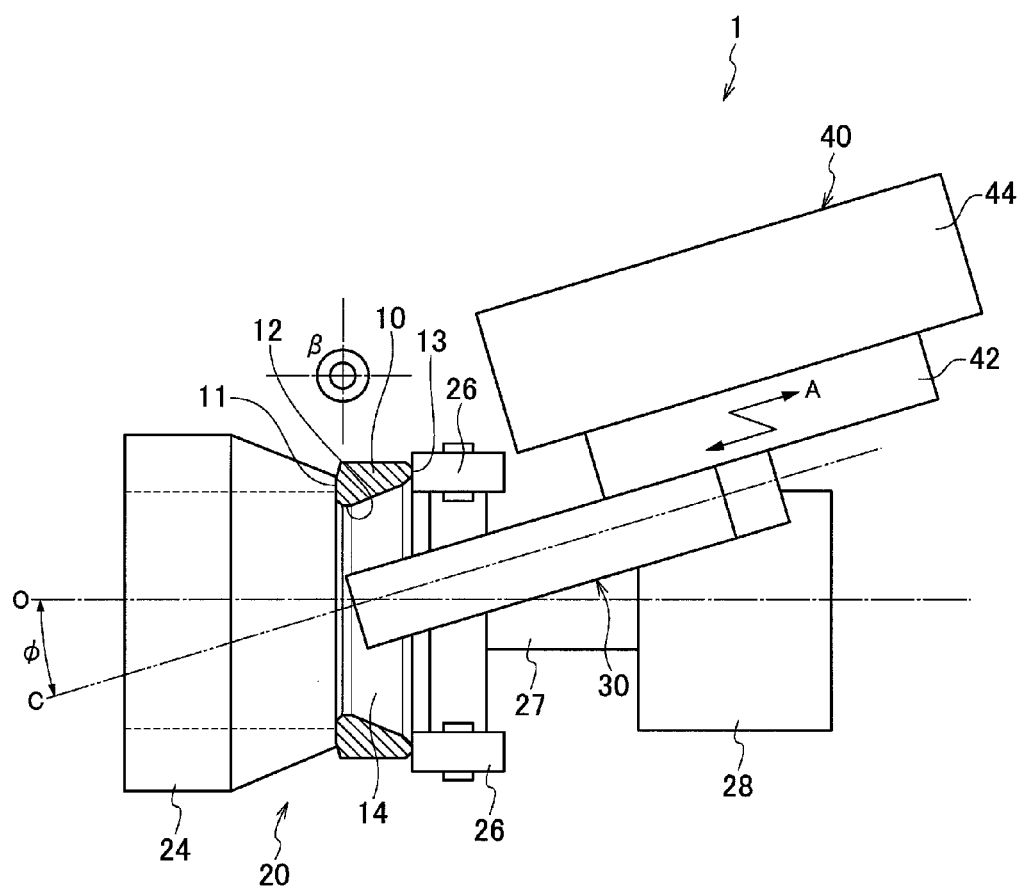
FIG. 2 is a schematic plan view of the superfinishing machine according to the embodiment of the present invention.

FIGS. 1 and 2 illustrate a schematic side view and a schematic plan view of a superfinishing machine 1 according to an embodiment of the present invention, respectively. The superfinishing machine 1 includes a rotatably holding section 20 holding an outer ring 10 (an annular member) of a tapered roller bearing such that the outer ring is rotatable around a center axis O, a pressing section 30 holding a grinding stone 3 and bringing a distal end surface 4 of the grinding stone 3 into pressure contact with a tapered raceway surface 14 formed on an inner peripheral surface 12 of the outer ring 10, and a linearly reciprocating mechanism 40 linearly reciprocating the grinding stone 3 held by the pressing section 30 in a desired direction.

Figure 3A:
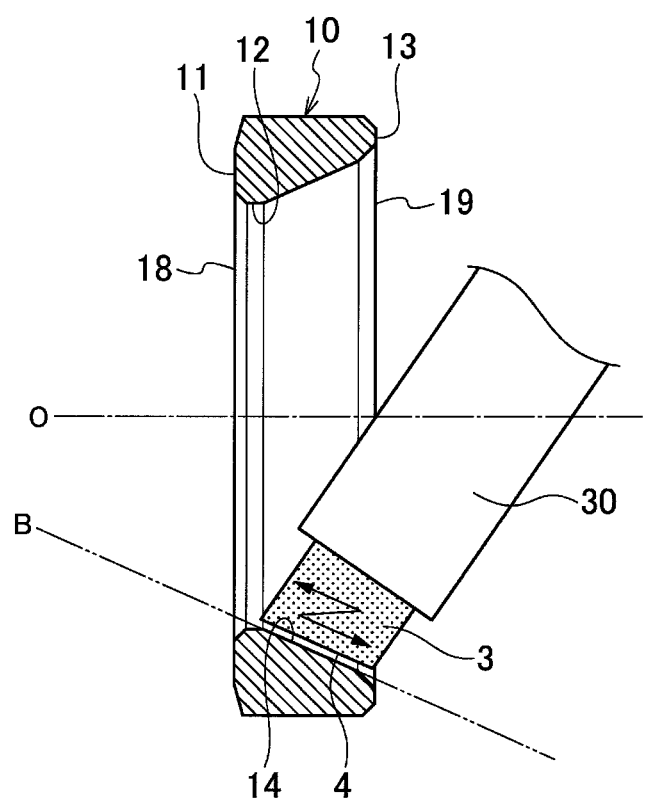
FIG. 3A is a side view illustrating an outer ring and a grinding stone.
Figure 3B:
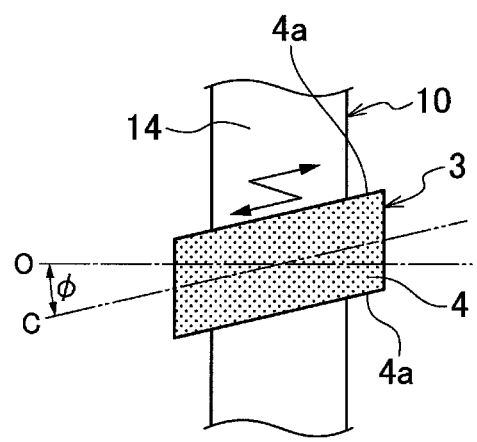
FIG. 3B is a plan view thereof.

Referring to FIGS. 3 and 4, the outer ring 10 is an outer ring of a tapered roller bearing, and is provided with a tapered raceway surface 14 formed on the inner peripheral surface 12 thereof, as described above. The raceway surface 14 is machined in advance to have a logarithmically crowned surface consisting of a crowning center portion 15 formed at a center thereof an axial direction, a first crowning drop portion 16 formed at one side of the crowning center portion 15 in the axial direction, and a second crowning drop portion 17 formed at the other side of the crowning center portion 15 in the axial direction. Herein, the one side in the axial direction is a small-diameter opening 18 side (left side in FIGS. 3A and 3B) of the outer ring 10 in the axial direction, and the other side in the axial direction is a large-diameter opening 19 side (right side in FIGS. 3A and 3B) of the outer ring 10 in the axial direction. Further, in FIGS. 1 and 3, a plane touching a generatrix of the logarithmically crowned surface of the raceway surface 14 is indicated by a reference sign B.

Figure 4B:
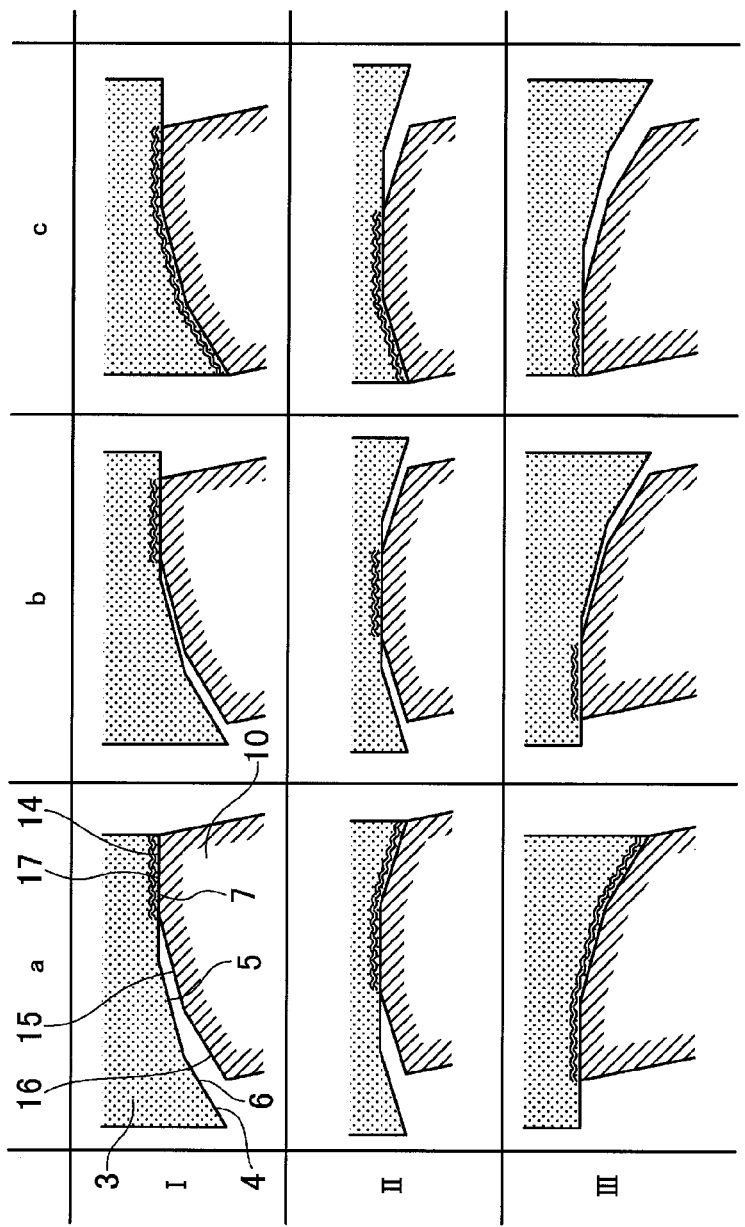
FIG. 4B is a diagram illustrating conditions in which a distal end surface of the grinding stone and a logarithmically crowned surface of the outer ring contact each other.

As illustrated in FIG. 3, the grinding stone 3 to be pressed against the outer ring 10 is formed to have a quadrangular column shape, and the distal end surface 4 thereof has a parallelogram shape in a cross section, and is arranged such that a set of opposite sides 4a, 4a, which are opposite to each other in a circumferential direction, is parallel to a direction inclined by an angle φ with respect to the center axis O. Further, a width of the distal end surface 4 in the axial direction is set to be larger than the width of the raceway surface 14 of the outer ring 10 in the axial direction. Further, as illustrated in FIG. 4B, the distal end surface 4 has a center portion 5 formed to correspond to the logarithmically crowned surface of the outer ring 10 and formed at its center portion in the axial direction to abut against the crowning center portion 15, a first convex portion 6 formed at the one side of the center portion 5 in the axial direction to abut against the first crowning drop portion 16, and a second convex portion 7 formed at the other side of the center portion 5 in the axial direction to abut against the second crowning drop portion 17.

Returning to FIGS. 1 and 2, the rotatably holding section 20 includes a shoe 22 placed on a base 21 and slidably supporting the outer ring 10 on an upper surface thereof, a back plate (rotation jig) 24 holding the one side 11 of the outer ring 10 in the axial direction and being able to rotate the outer ring around the center axis O, and a pair of pusher rolls 26 and 26 abutting against the other side 13 of the outer ring 10 in the axial direction and pressing the outer ring 10 against the back plate 24 to clamp the outer ring 10. The pair of the pusher rolls 26 and 26 are supported by a support member 27, and transmit a clamping force of a clamp device 28 to the outer ring 10 via the support member 27.

The pressing section 30 is formed in a substantially rectangular parallelepiped shape, and holds the grinding stone 3 at a front end thereof, the grinding stone 3 being fixed or released by clamp bolts (not illustrated). Further, the pressing section 30 and the grinding stone 3 are disposed to be tilted at an angle θ toward the large-diameter opening 19 side (toward the other side in the axial direction) of the outer ring 10 with respect to a perpendicular line L of the raceway surface 14 by a rotation table 44 which will be described later, thereby preventing an interference between the pressing section 30 or the grinding stone 3 and the outer ring 10. In addition, the pressing section 30 and the grinding stone 3 are disposed toward a direction inclined at a given angle φ with respect to the center axis O of the outer ring 10.

The linearly reciprocating mechanism 40 includes an oscillation table 42 holding a side of the pressing section 30 and being able to linearly reciprocate in a direction of a plane B (direction of an arrow A) touching the generatrix of the raceway surface 14, and a pivotable rotation table 44 holding the oscillation table 42 and being pivotable around imaginary axes α and β perpendicular to the center axis O. Accordingly, the rotation table 44 is pivoted around the imaginary axis α to adjust the angle θ, and is pivoted around the imaginary axis β to adjust the angle φ. In this instance, the angle φ is adjusted in the range of 0°<φ<40°, for example.

In the superfinishing method using the superfinishing machine 1 including the above configuration, first, the back plate 24 is rotated, and thus the outer ring 10 supported by the shoe 22 and pressed against the pair of pusher rolls 26 is rotated around the center axis O.

Subsequently, the distal end surface 4 of the grinding stone 3 is pressed against the raceway surface 14 (logarithmically crowned surface) of the outer ring 10 by the pressing section 30. In this instance, the angles θ and φ of the pressing section 30 and the grinding stone 3 are adjusted in advance by the rotation table 44 to have an appropriate value.

The oscillation table 42 is driven, and thus the grinding stone 3 is linearly reciprocated along the plane B touching the generatrix of the raceway surface 14 (logarithmically crowned surface) of the outer ring 10, and in the direction C inclined by a given angle φ with respect to the center axis O of the outer ring 10, thereby superfinishing the raceway surface 14.

EXAMPLE

Figure 4A:
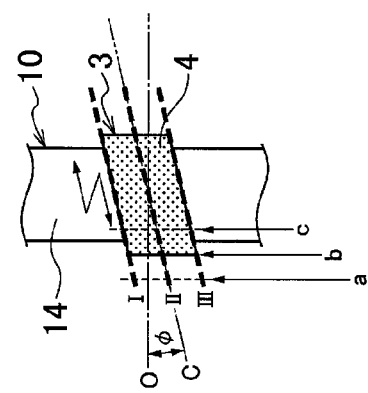
FIG. 4A is a diagram illustrating a manner in which the grinding stone linearly reciprocates on a raceway surface of the outer ring.

FIG. 4 illustrates conditions in which the distal end surface 4 of the grinding stone 3 and the logarithmically crowned surface of the raceway surface 14 of the outer ring 10 contact each other, in the case of machining the workpiece using the superfinishing method of this embodiment. In FIG. 4A, reference signs a, b, c indicate one end, an intermediate portion, and the other end in the linearly reciprocating movement of the grinding stone 3, respectively. Reference signs I, II, III indicate imaginary planes passing through one side portion, an intermediate portion and the other side portion of the grinding stone 103 in a circumferential direction, respectively. Further, in FIG. 4B, the portion, indicated by a double wavy line, on the distal end surface 4 of the grinding stone 3 represents a portion brought into contact with the raceway surface 14 of the outer ring 10.

Figure 5A:
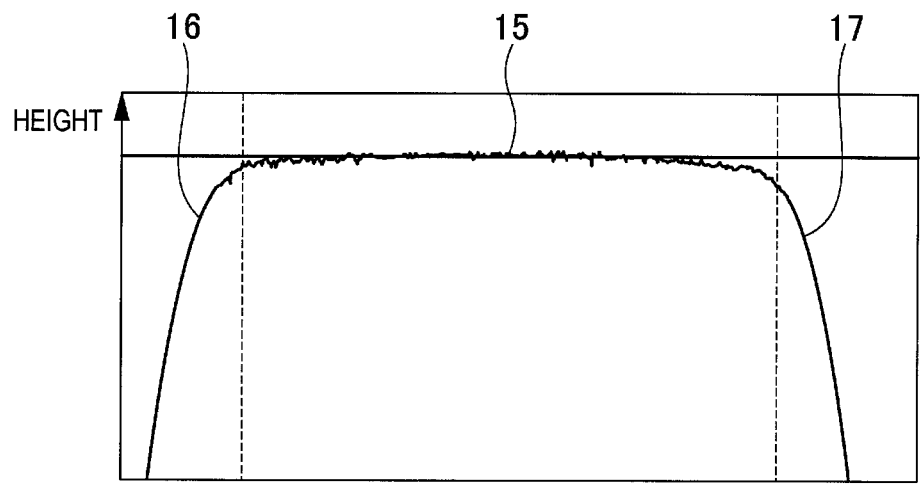
FIGS. 5A and 5B are graphs showing a profile and a surface roughness of the logarithmically crowned surface, respectively, before superfinishing.
Figure 5B:
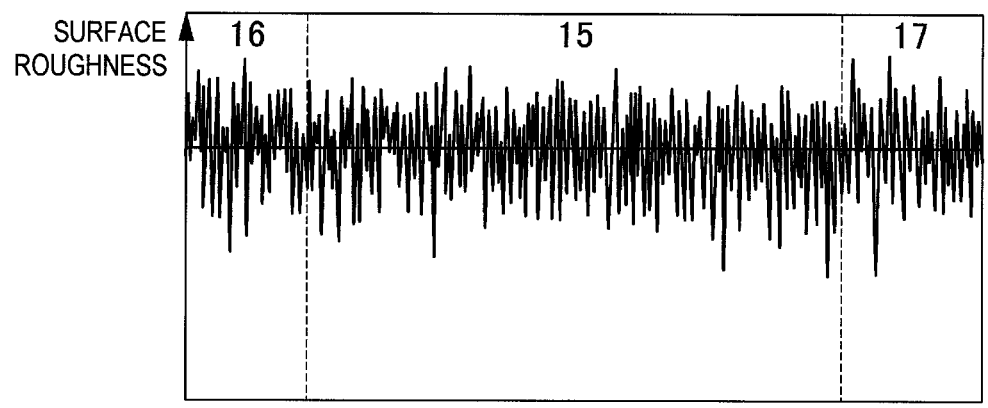
Figure 5C:
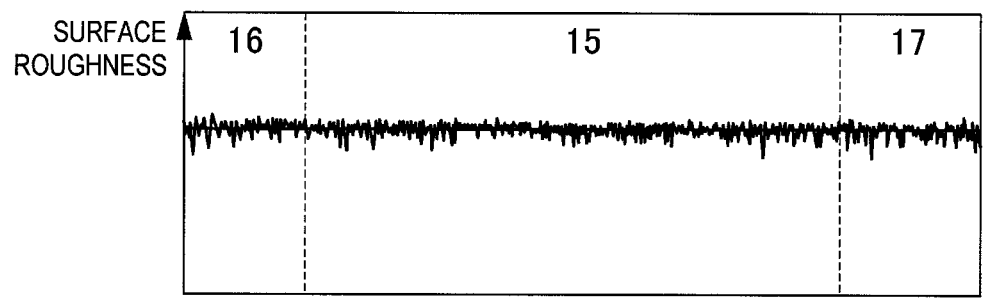
FIG. 5C is a graph showing the surface roughness of the logarithmically crowned surface after the superfinishing.
Figure 7B:
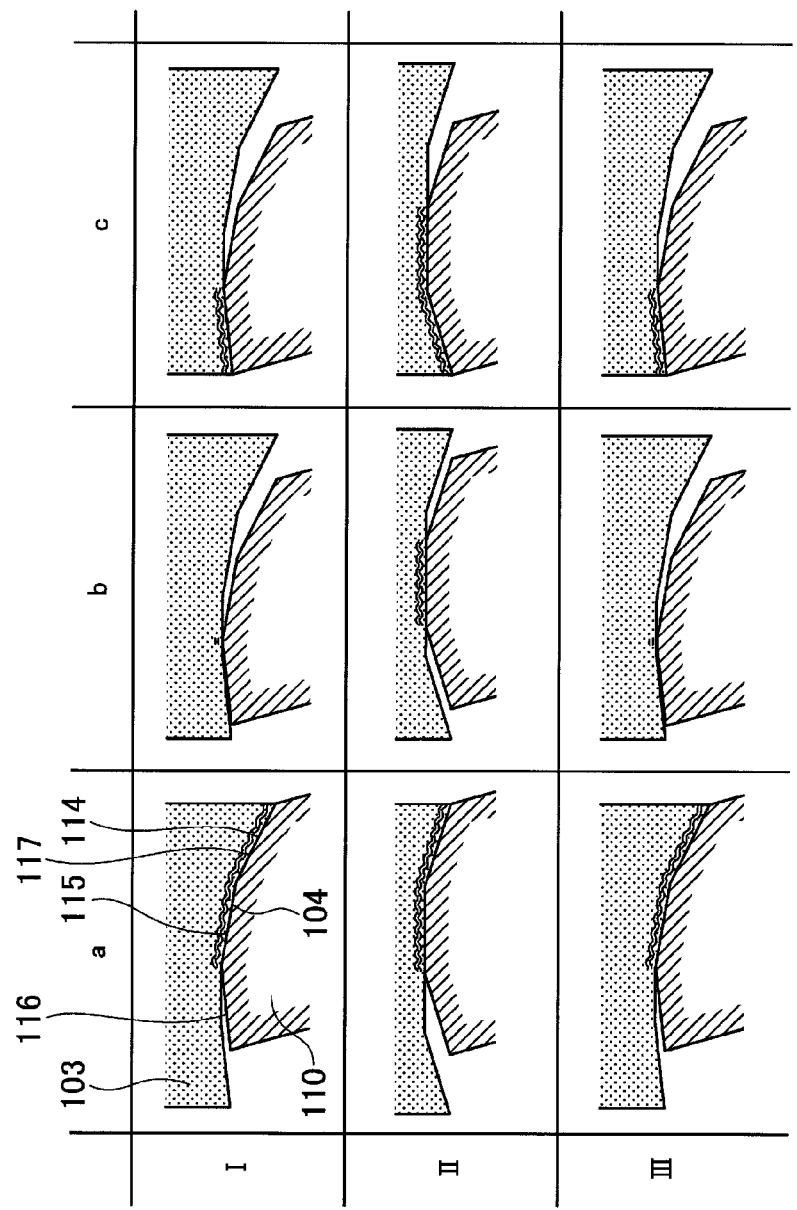
FIG. 7B is a diagram illustrating conditions in which a distal end surface of a grinding stone and a logarithmically crowned surface of an outer ring contact each other.
Figure 7A:
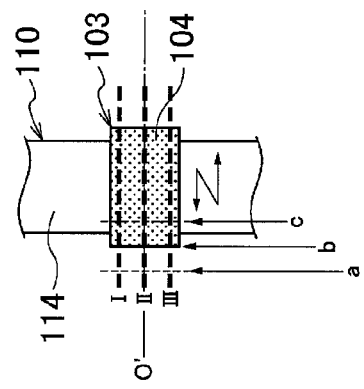
FIG. 7A is a diagram illustrating a manner in which a grinding stone linearly reciprocates on a raceway surface of an outer ring.
Figure 8:
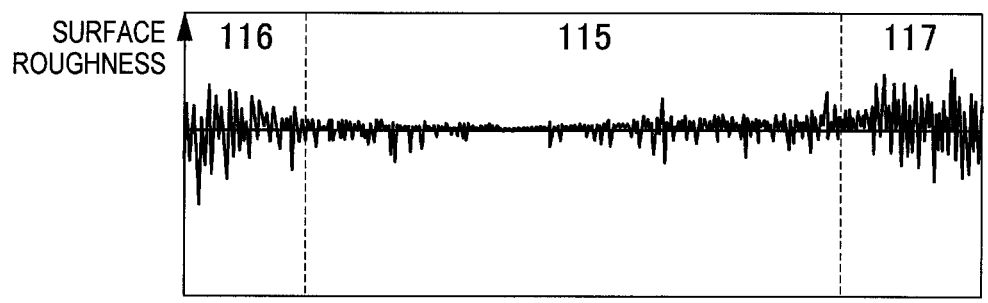
FIG. 8 is a graph showing surface roughness of the logarithmically crowned surface superfinished by the superfinishing method of FIG. 7.

FIGS. 5A and 5B show graphs showing a profile (height) and surface roughness of the center portion 15 and the first and second crowning drop portions 16 and 17 of the logarithmically crowned surface, respectively, before the superfinishing. FIG. 5C shows a graph showing the surface roughness of the logarithmically crowned surface after the superfinishing.

First, as illustrated in FIG. 4B, at the one side portion I of the grinding stone 3 in the circumferential direction, the second convex portion 7 of the distal end surface 4 always abuts against the second crowning drop portion 17 of the raceway surface 14 at all positions a, b, c in the linearly reciprocating movement of the grinding stone 3. In particular, the grinding stone 3 is configured to abut against the distal end surface 4 and to press it at all locations on the logarithmically crowned surface of the raceway surface 14 when being displaced to the position c.

Further, at the intermediate portion II of the grinding stone 3 in the circumferential direction, the center portion 5 of the distal end surface 4 always abuts against the crowning center portion 15 of the raceway surface 14 at all positions a, b, c in the linearly reciprocating movement of the grinding stone 3. In addition, the second convex portion 7 abuts against the second crowning drop portion 17 at the position a, and the first convex portion 6 abuts against the first crowning drop portion 16 at the position c.

Furthermore, at the other side portion III of the grinding stone 3 in the circumferential direction, the first convex portion 6 of the distal end surface 4 always abuts against the first crowning drop portion 16 of the raceway surface 14 at all positions a, b, c in the linearly reciprocating movement of the grinding stone 3. In particular, the grinding stone 3 is configured to abut against the distal end surface 4 and to press it at all locations on the logarithmically crowned surface of the raceway surface 14 when being displaced to the position a.

Accordingly, the distal end surface 4 of the grinding stone 3 abuts against all of the crowning center portion 15, the first crowning drop portion 16, and the second crowning drop portion 17 of the raceway surface 14 at any positions a, b, c in the linear reciprocating movement. Therefore, as illustrated in FIG. 5C, it is possible to perform the finishing on the logarithmically crowned surface uniformly in the axial direction in a short time.

The present invention is not limited to the embodiment described above, and changes and modifications can be made therein as appropriate. For example, in the above-described embodiment, the inner peripheral surface of the outer ring of the tapered roller as the annular member is provided with the logarithmically crowned surface, but the annular member is not specifically limited to the outer ring of the tapered roller. It may be a member of an annular shape, and may be an outer ring of a cylindrical roller bearing, or an outer ring of a needle roller bearing. In addition, also in a case where the outer peripheral surface of the annular member is provided with a concave curved shape, the superfinishing method of the present invention can be applied.

This application is based on Japanese Patent Application No. 2011-244683 filed on Nov. 8, 2011, the entire content of which is incorporated herein by reference.

EXPLANATION OF REFERENCE SIGNS

3: grinding stone
4: distal end surface
5: center portion
6: first convex portion
7: second convex portion
10: outer ring
11: one side in axial direction
12: inner peripheral surface
13: the other side in axial direction
14: raceway surface
15: crowning center portion
16: first crowning drop portion
17: second crowning drop portion
18: small-diameter opening
19: large-diameter opening
20: rotatably holding section
21: base
22: shoe
24: back plate (rotation jig)
26: pusher roll
27: support member
28: clamp device
30: pressing section
40: linearly reciprocating mechanism
42: oscillation table
44: rotation table

The invention claimed is:
1. A superfinishing machine comprising:
a rotation jig configured to hold an annular member such that the annular member is rotatable around a center axis of the annular member, the annular member having a logarithmically crowned surface formed on an inner peripheral surface thereof;
a pressing section configured to hold a grinding stone and to bring a distal end surface of the grinding stone into pressure contact with the logarithmically crowned surface of the annular member rotating around the center axis; and
a linearly reciprocating mechanism configured to linearly reciprocate the grinding stone held by the pressing section, along a plane touching a generatrix of the logarithmically crowned surface, and in a direction inclined by a given angle with respect to the center axis of the annular member, thereby superfinishing the logarithmically crowned surface,
wherein the distal end surface of the grinding stone has a quadrangular shape in a cross section when seen from a radial direction and is formed such that a set of opposite sides is parallel to the inclined direction, and
each side portion of the distal end surface in a circumferential direction is formed with a portion configured to abut against all locations on the logarithmically crowned surface along the inclined direction.

2. The superfinishing machine according to claim 1, wherein the annular member is an outer ring of a tapered roller bearing, and
the outer ring is rotated around the center axis, and the distal end surface of the grinding stone is brought into pressure contact with a raceway surface, being the logarithmically crowned surface, formed on an inner peripheral surface of the outer ring, thereby superfinishing the raceway surface.

3. The superfinishing machine according to claim 1, wherein the annular member is an outer ring of a cylindrical roller bearing, and
the outer ring is rotated around the center axis, and the distal end surface of the grinding stone is brought into pressure contact with a raceway surface, being the logarithmically crowned surface, formed on an inner peripheral surface of the outer ring, thereby superfinishing the raceway surface.

4. A superfinishing method comprising:
bringing a distal end surface of a grinding stone into pressure contact with a logarithmically crowned surface formed on an inner peripheral surface of an annular member rotating around a center axis thereof to superfinish the logarithmically crowned surface; and
linearly reciprocating the grinding stone in a direction inclined by a given angle with respect to the center axis of the annular member along a plane touching a generatrix of the logarithmically crowned surface, wherein the distal end surface of the grinding stone has a quadrangular shape in a cross section when seen from a radial direction and is formed such that a set of opposite sides is parallel to the inclined direction, and each side portion of the distal end surface in a circumferential direction is formed with a portion configured to abut against all locations on the logarithmically crowned surface along the inclined direction.

5. An outer ring of a tapered roller bearing, the outer ring comprising a raceway surface superfinished by the superfinishing method set forth in claim 4.

6. An outer ring of a cylindrical roller bearing, the outer ring comprising a raceway surface superfinished by the superfinishing method set forth in claim 4.

* * * * *